R. E. McGAHEY.
TRUCK LEVER CONNECTING ROD.
APPLICATION FILED JAN. 26, 1922.
1,435,720.  Patented Nov. 14, 1922.
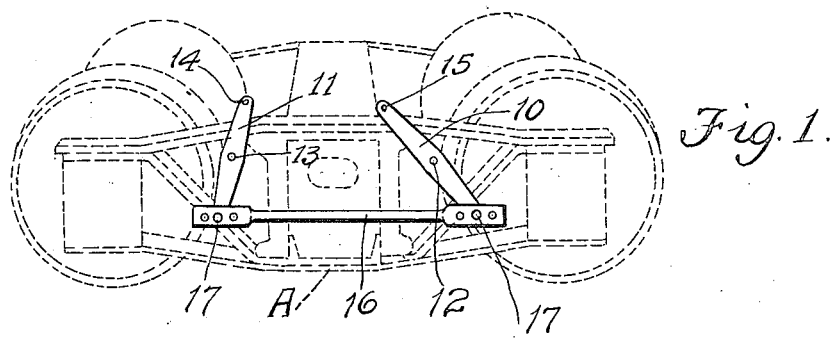
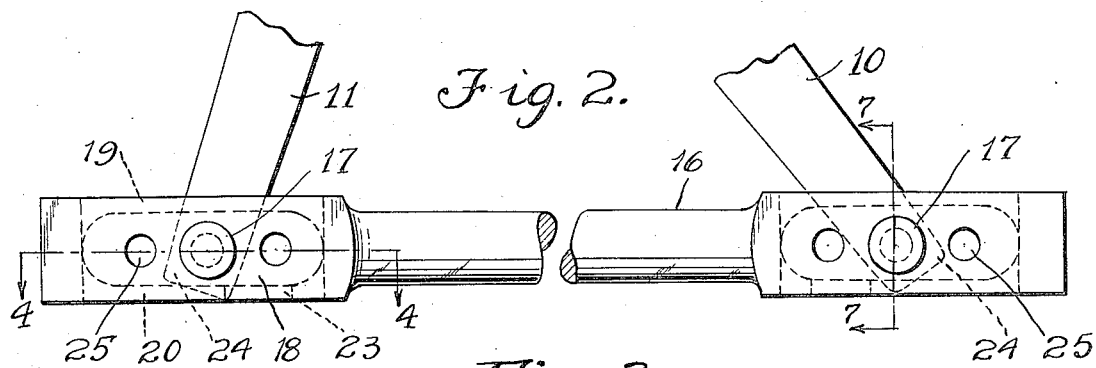
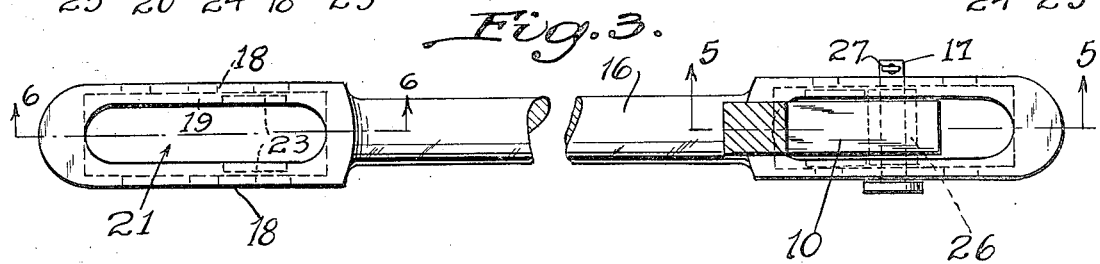
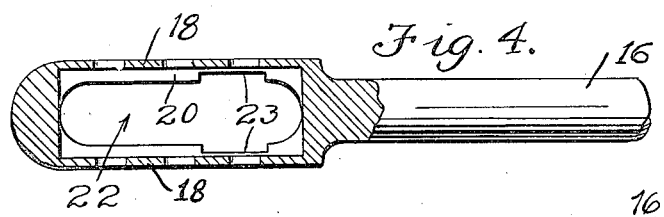
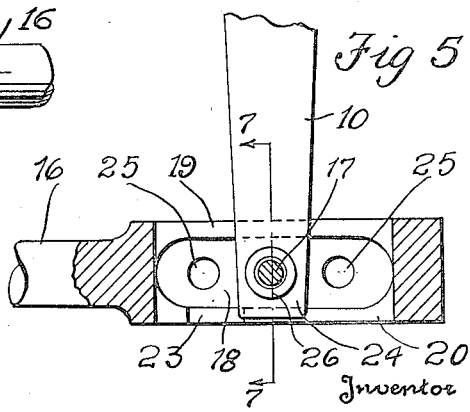
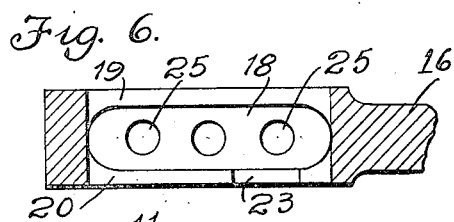
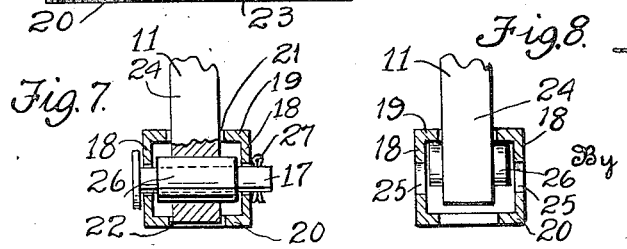
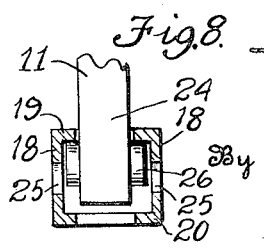

Patented Nov. 14, 1922.

1,435,720

UNITED STATES PATENT OFFICE.

ROBERT E. McGAHEY, OF ALEXANDRIA, VIRGINIA.

TRUCK-LEVER CONNECTING ROD.

Application filed January 26, 1922. Serial No. 531,986.

*To all whom it may concern:*

Be it known that I, ROBERT E. MCGAHEY, a citizen of the United States, residing at Alexandria, in the State of Virginia, have invented certain new and useful Improvements in Truck-Lever Connecting Rods, of which the following is a specification.

This invention relates to truck lever connecting rods and has for an object to provide improved means whereby, when the pintle pin of the connection becomes lost or displaced, the connecting rod is maintained against dropping to the damage and injury of the rolling stock and track.

A further object of the invention is to provide a connecting rod having oppositely directed channel sections into which is inserted a member carried by the lever of such dimensions as to maintain its position within the channeled extremity while permitting movement longitudinally of the connecting rod, irrespective of the pin employed for maintaining the adjusted position of the lever relative to the rod.

With these and other objects in view, the invention comprises certain novel parts, elements, units, constructions, combinations, mechanical movements and functions as disclosed in the drawing together with mechanical equivalents thereof, as will be hereinafter more fully described and claimed.

In the drawings:

Figure 1 is a view of the present invention shown in position upon a truck shown in dotted lines.

Figure 2 is a view in side elevation of the improved connecting rod and lever extremities.

Figure 3 is a top plan view of the connecting rod at one end showing one of the levers in position and shown in section.

Figure 4 is a longitudinal sectional view upon a normal horizontal plane as indicated by line 4—4 of Figure 2 but with the lever omitted.

Figure 5 is a sectional view upon a normal vertical plane taken on line 5—5 of Figure 3.

Figure 6 is a section taken on a normal vertical plane as indicated by line 6—6 of Figure 3.

Figure 7 is a transverse sectional view taken on a normal vertical plane as indicated by line 7—7 of Figures 2 and 5.

Figure 8 is a section taken on the same plane as Figure 7 but with the pin displaced as it would be in becoming lost and the connecting rod dropped down disclosing the safety features of the present invention.

Like characters of reference indicate corresponding parts throughout the several views.

The improved truck lever connecting rod which forms the subject matter of this invention is in general effect substantially the same as the connecting rods now generally in use and is intended to be applied to the regular equipment found upon the rolling stock of modern railrads. As is well known, the trucks which are indicated in dotted lines at A are equipped with levers 10 and 11, respectively pivoted to the brake shoe organizations at 12 and 13. No attempt has been made to show the complete connection, it being understood, of course, that the lever 11 is pivoted to a yoke or stirrup at 14 while the pull rod is connected to the lever 10 at 15.

Interposed between the lower extremities of the two levers 10 and 11 is the lever connecting rod indicated as an entirety at 16 and found in some form upon substantially all trucks of the present day cars.

In the present instance, the ends of this connecting rod 16 are provided with means for maintaining the rod against dropping in case the pintle pin 17 is lost. As both ends of the connecting rod preferably are and are here shown as identical, the description of one end will apply equally to the other. The ends are provided with spaced members 18 having upper and lower flanges 19 and 20 respectively forming oppositely positioned channels with the flanges of each of said channels directed toward the other forming a box-like construction, as indicated more particularly at Figure 7, with slots 21 and 22 in the top and bottom respectively of said ends. The bottom flanges 20 are cut away at 23, as more clearly understandable from reference to Figure 4, eliminating at that particular point the greater portion of the under flange 20 and for the purpose which will be hereinafter more fully explained.

The slots 21 and 22 in the top and bottom of the boxing respectively are of such proportion as to permit the passage therethrough of the lower extremity 24 of the levers 10 and 11, and perforations 25 are provided in substantially the usual and ordinary manner and spacing to receive the pintle 17 which is passed therethrough and through the extremity of the levers. This connection of the pintle extending through the perforations 25 and through the lower end 24 of the levers forms a pivotal connection between the levers and the connecting rod and is so far substantially the usual and ordinary connection.

When, however, under known conditions, the pintle 17 is broken or lost, there is nothing to support that end of the connecting rod which falls down, thereby disconnecting the brake structure and putting it out of commission; also, in some instances, at least dropping the rod to the extent of damaging the rolling stock and track. To prevent this, the perforation in the end 24 of the levers 10 and 11 is reamed out to such extent as to receive the sleeve 26 which is made of such length as to engage the flanges 19 so that in case the pintle 17 is lost or broken the connecting rod is still supported by engagement of the sleeve 26 with such flanges and requires only the replacement of the pin 17 to complete the connection and put the joint in operative condition. It will be noted, as heretofore mentioned, that the flange 20 is cut away at 23. This cut away portion is for the purpose of assembling the parts, which is carried out by lifting the connecting rod until the lower extremity 24 of the lever passes downwardly through the slot 22 and is exposed beneath the rod a sufficient distance to permit the sleeve 26 to be inserted through the perforation in the extremity of said lever, whereupon the rod is dropped and the sleeve passes through the cut out portion 23 and engages against the top flange 19. The opening through the sleeve 26 and one of the perforations 25, as may be found desirable, may now be co-ordinated and the pin 17 inserted through the registering openings and secured in any approved manner as by the cotter pin 27. In this position, the sleeve performs no function except as stiffening the pintle pin 17 by spanning the interval between the sides of the levers and the side members 18 which, however, is an important function. When, however, the pintle 17 is displaced in any manner, the sleeve 26 immediately functions in its safety relation by supporting the rod upon the sleeve as indicated more particularly at Figure 8, at which figure is shown the relation of the parts with the pintle removed and the rod supported in its safety position wholly upon and by the sleeve 26.

It is the purpose of the present invention to employ the regular equipment of levers represented here as the levers 10 and 11, as now found upon rolling stock commonly in use and the same pintle pin 17 as now also employed and, when the safety sleeve and improved connecting rod are applied thereto, to simply ream out the opening in the lower end of the lever as now drilled to receive the pintle pin, making such opening of proper proportion to receive the sleeve whereupon the entire equipment has been changed from the ordinary unsafe to the safe condition disclosed in the present invention. It is obvious, of course, that the present connecting rod may be applied to the equipment indicated by the levers 10 and 11 without employing the sleeve 26 and by simply employing the usual pintle represented at 17 which may be done as an emergency or quick repair measure to be later completed by reaming out of the opening in the levers and the insertion of the sleeve.

What I claim to be new is:

1. The combination with spaced truck levers of a connecting rod extending between the levers and provided with channeled extremities, a sleeve inserted through the lower ends of the levers and seated slidably within the channels, and a pintle inserted through the rod and through the sleeve.

2. The combination with spaced truck levers of a connecting rod having its extremities formed as spaced channel members with the inturned flanges proximate and providing spaces to receive the extremities of the levers, a sleeve disposed within one pair of the channels and inserted through the extremity of the interposed lever, and a pintle inserted through the channel members and through the sleeve.

3. A joint comprising spaced channel members having registering perforations through their sides, a lever inserted between the flanges of the channels, a sleeve inserted through the lever and having its ends extended laterally beyond the sides of the lever and proportioned to engage the flanges of the channel, and a pintle inserted through the sides of the channeled structure and through the sleeve.

4. A joint comprising spaced side plates provided with registering transverse perforations and with inturned proximate flanges, a lever inserted through the member and interposed between the flanges, a sleeve inserted through the lever and having its ends extending laterally beyond the sides on the lever and in position to engage the flanges and support the member, and a pintle inserted through the side plates and through the sleeve.

5. A joint comprising spaced side plates having perforations therethrough, inturned flanges formed upon the side plate forming an intervening space, a lever inserted through the intervening space, a sleeve inserted through the lever and having its opposite ends extending laterally beyond the sides of the lever proportioned to engage under the flanges and support the joint, and a pintle inserted through the perforations of the side plate and through the sleeve and normally supporting the side plates with the flanges out of engagement with the sleeve.

6. A safety joint comprising a box-like structure having along its upper sides inturned flanges forming an intervening space, a lever inserted into the intervening space, a sleeve inserted through the lever and having its ends extending laterally beyond the sides of the lever and proportioned to slide within the box-like structure and engage under the flanges, and a pintle inserted through the structure and through the sleeve and supporting the parts with the flanges normally out of engagement with the sleeve but positioned to engage the sleeve when the pintle is removed.

In testimony whereof I affix my signature.

ROBERT E. McGAHEY.